United States Patent [19]

Landa

[11] Patent Number: 4,720,903

[45] Date of Patent: Jan. 26, 1988

[54] TOOL FOR ASSEMBLY AND DISASSEMBLY OF PLANETARY FOR AUTOMATIC TRANSMISSION

[76] Inventor: Sanford Landa, 44 Brookdale Ct., Highland Park, N.J. 08904

[21] Appl. No.: 940,800

[22] Filed: Dec. 12, 1986

[51] Int. Cl.$^4$ .................. B21D 39/00; B23P 11/00
[52] U.S. Cl. ................................ 29/243.52; 29/283.5
[58] Field of Search ............... 29/243.52, 283.5, 243.5, 29/270, 256, 281.1, 283; 72/401, 402, 477

[56] References Cited

U.S. PATENT DOCUMENTS

| | | | |
|---|---|---|---|
| 164,291 | 6/1875 | Gleason et al. | 72/477 |
| 2,658,550 | 11/1953 | Emshwiller | 29/243.52 |
| 3,531,971 | 10/1970 | Robb et al. | 72/401 |
| 4,233,730 | 11/1980 | Godbe | 29/283.5 |
| 4,380,165 | 4/1983 | Post | 72/401 |
| 4,627,147 | 12/1986 | Kagi | 29/283.5 |

Primary Examiner—Robert C. Watson
Attorney, Agent, or Firm—Ronald G. Goebel

[57] ABSTRACT

The invention provides a tool for removing a lance or indentation in the retainer of the planetary of an automatic transmission and for forming a lance in the retainer after replacement of friction or steel plates. The tool includes a circular base having a raised curved exterior section and a raised curved interior section spaced apart by a gap. The interior section has an indentation in the outer wall. A first insert fits within the gap having a curved front wall facing the interior section and also having the same curvature thereof. A second insert is fittable within the gap having a protrusion capable of registering with the indentation. Means for exerting inward compression between the first and second inserts against the interior section are provided to remove a lance, in the case of the first insert, or to form a lance in the case of the second insert.

6 Claims, 9 Drawing Figures

TOOL FOR ASSEMBLY AND DISASSEMBLY OF PLANETARY FOR AUTOMATIC TRANSMISSION

BACKGROUND OF THE INVENTION

This invention is concerned with a tool for removing a lance from each retainer of a planetary of an automatic transmission to allow disassembly thereof and for forming a lance on each retainer after assembly thereof.

A planetary for an automobile automatic transmission comprises inter alia, a case or housing having an annular flange. Mounted on the case is a retainer casing having an annular flange which mates with an annular flange of the case. Disposed around and above the retainer casing are plate retainers having a curved contour which matches the curvature of the casing. A series of friction plates and steel plates having openings are fittable over the retainers in alternating fashion topped by a pressure plate. If replacement of the friction or steel plates is necessary the pressure plate is lifted off the retainer followed by the removal of worn friction and/or steel plates, reassembly being the reverse procedure with the new friction and/or steel plates. In most cases the pressure plate is unlocked, that is, the pressure plate may be slipped off the retainer without encountering any locking means or obstructions. However, in the case of planetaries of Renault MB1 automatic transmissions made since 1983, each retainer is indented inwardly of its center, called lances, so that the only way to remove the pressure plate is to remove the lance or stated otherwise to curve the retainer so that the pressure plate can be lifted thereover. It is also necessary to re-lance the retainer after reassembly of the plates and pressure plate.

In the past this was accomplished by using pliers or a makeshift bracing method to remove the lance for disassembly and using the same method to re-lance the retainer.

The present invention provides a tool for removing the lance in retainers of planetaries having lanced retainers and for reforming a lance after reassembly which is efficient, fast and effective.

SUMMARY OF THE INVENTION

The invention provides a tool for removing a lance or indentation from a retainer of the planetary of an automatic transmission to gain access to the friction or steel plates thereof and for reforming a lance in said retainer after the friction and/or steel plates have been replaced to once again lock the pressure plate over the friction and steel plates.

In brief, the tool comprises a circular metal base having a raised, curved exterior section and a raised curved interior section with a gap therebetween. The exterior and interior section are preferably concentric. An indentation is formed in the outer wall of the raised interior section. A first insert is fittable within the gap between the exterior section and interior section. The first insert comprises a flat rectilinear plate having a curved front wall, i.e. the wall facing the interior section. A second insert is also fittable in the gap comprising a flat rectilinear plate having a protrusion in its front wall capable of registering with the indentation of the interior section. The external section also has a pair of threaded bores, spaced 180° apart, into which threaded bolts are placed. Both bolts are capable of engaging the back wall of each insert. The tool also has a locking plate which can lock the planetary to the tool in an inverted position.

In use, the planetary having the lanced retainer is inverted and locked on the tool having the first insert in place in the tool. The lanced retainer is made to occupy the space between the front curved wall of the first insert and the outer wall of the interior section. The bolts contacting the insert is moved toward the interior section thus compressing the front wall of the insert against the lance which in turn is compressed against the curved outer wall of the interior section.

When the planetary is reassembled, the pressure plate is again placed over the retainer to confine the pressure and steel plate thereto. To relock the pressure plate by re-lancing the retainers, the planetary is inverted and placed in the tool, which now contains the second insert. The second insert is placed in the gap between the interior and exterior sections with the protrusion on the second insert in facing relationship to the indentation in the interior section. Thereafter the bolt is tightened in its bore against the rear wall of the second insert so that the protrusion applies compressive force against the retainer, thus forming a lance in the retainer substantially the same as originally present.

DETAILED DESCRIPTION OF THE PREFERRED EMBODIMENTS

Figure 1:
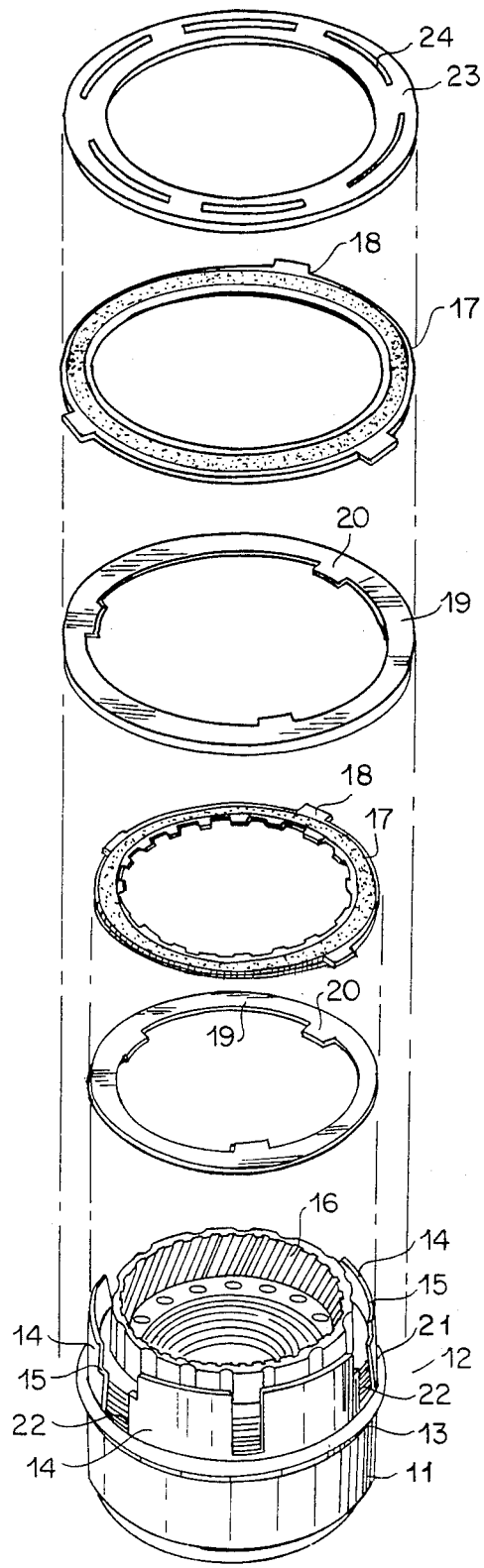
FIG. 1 is an exploded view of a planetary for a Renault MB1 automatic transmission.

Referring to FIG. 1 there is shown an exploded view of a planetary for a Renault MB1 in automatic transmission which have been installed in Renault automobiles by the Regie Nationale Des Usines Renault company since 1983. The planetary consists of a case or housing 11 containing the elements of the transmission which will not be described in detail herein because such elements are well known in the art and do not constitute a part of the present invention. Mounted on the case 11 is a retainer casing shown generally by 12 having annular flange 12 which mates with an annular flange on the case 11 (not shown). Disposed around and above the retainer casing are six plate retainers 14 having a curved contour matching the curvature of the case 11 and retainer casing 12. Each retainer is spaced apart a predetermined distance to accomodate the tabs of steel plates which will be described in more detail hereafter. Each retainer has a shoulder 15 formed therein to support and retain the pressure plate 23. Inward of the retainer is outer ring gear 16 for the planetary carrier. Insertable between gear 16 and retainer 14 are a series of friction plates 17 having three (3) evenly spaced external tabs 18 and a series of steel plates 19 having three evenly spaced internal tabs 20. An undulated table cushioning ring 21 lies against the flange 13 of retainer casing 12. The plates 17 and 19 are alternately placed between the retainers 14 and gear 16 with a steel plate 19 being the lowermost plate (resting on the cushioning ring) and a friction plate 17 being the uppermost plate. The drawings show two friction plates and two steel plates for purposes of illustration. Actually the planetary carries four or five friction plates and four or five steel plates. The inner tabs 19 of each steel plate fit between the spaces 22 formed between the adjacent ends of retainers 14 bearing shoulder 15 thereby preventing rotational movement of the steel plates. Mounted over the topmost friction plate 17 is pressure plate 23 having curved openings 34 which accomodate the ends of retainers 14. When the pressure plate 23 is placed over the retainers and over the topmost friction plate the retainer is extended upwardly about ⅜".

Figure 6:
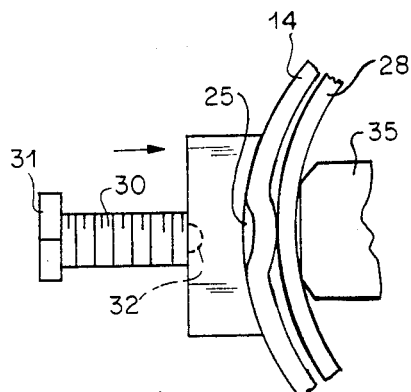
FIGS. 6 & 7 show diagrammatically the removal of a lance on a retainer using the tool and the insert of FIG. 4.
Figure 7:
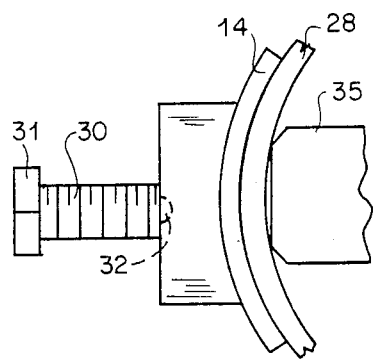

In disassembling most planetaries on automobiles other than Renault to replace the friction or steel plates one, after removing a retaining snap ring, merely lifts the pressure plate 23 off the retainers and thereafter removes the friction and steel plates. However, in the case of the Renault MB1 planetaries made since 1983, for example, each retainer 14 is stressed at the center of the portion thereof extending upwardly of the pressure plate, i.e. lanced so that such portion is concaved inwardly as shown in FIG. 6 by reference numeral 25. Such configuration serves to lock the pressure plate 23 over the friction and steel plates. In order to remove the pressure plates the lances 25 must be relieved so that the curvature of the retainer portion achieves an unbroken curved contour matching that of the opening 24 of the pressure plate 23. The tool of this invention allows removing of the lances 25 of the retainers to prevent disassembly and replacement of the friction and/or steel plates and provides re-lancing of the retainer portion after replacement of the lower plates and the friction plate.

Figure 2:
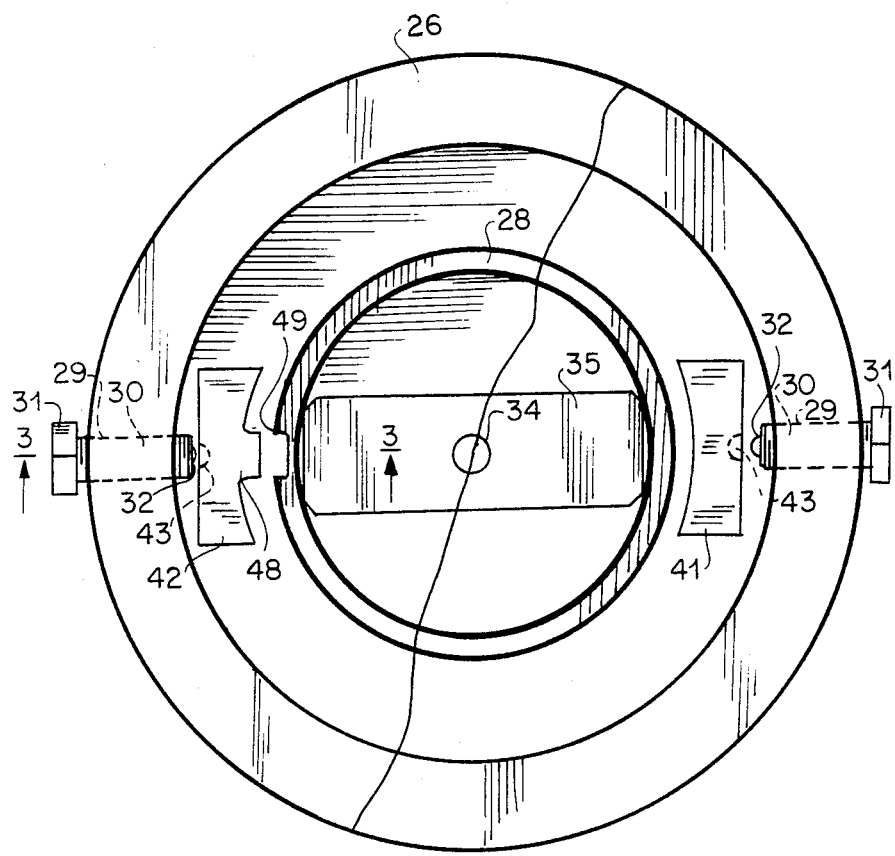
FIG. 2 is a plan view of a tool according to the invention for removing the pressure plate of the transmission of FIG. 1.
Figure 3:
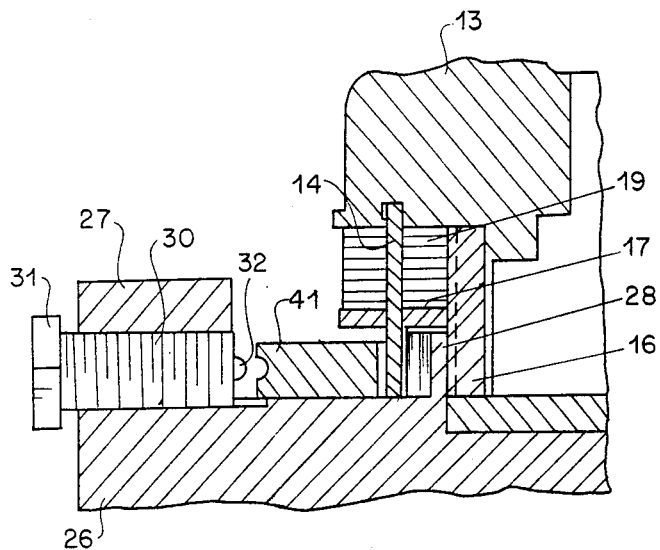
FIG. 3 is a sectional view of the tool of FIG. 2 through line 3—3 of FIG. 2.

The tool of the invention as shown in FIGS. 2 & 3 consists of a metal circular base 26 having a raised annular exterior section 27 and a raised annular interior section 28. Two threaded holes 29 extend through exterior section 27, 180° apart. These holes threadably receive bolts 30 having head 31 and ball 32 at the terminus of the bolt stem. The tool has a center threaded hole (not shown) which threadably accomodates lock bolt 34. A locking member 35 consisting of a metal bar having a central aperture is inserted through the bolt and serves to lock the planetary gear to be disassembled and reassembled to the tool.

Figure 5:
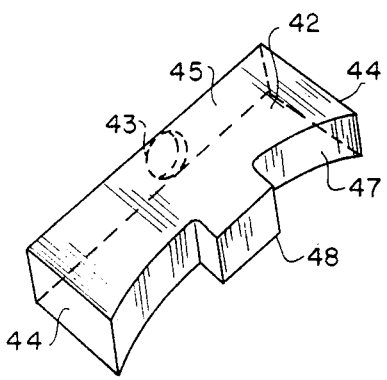
FIG. 5 shows an insert for the tool of FIG. 2 used to create a lance on the retainer of the transmission of FIG. 1.
Figure 4:
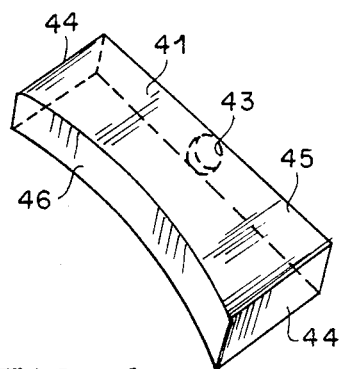
FIG. 4 shows an insert for the tool of FIG. 2 used to remove a lance on the retainer of the transmission of FIG. 1.

Referring to FIGS. 2, 4 & 5 there are shown inserts 41 and 42. Insert 41 is used with the tool to relieve the lance in retainer 14 before disassembly. Insert 42 is used with the tool to recreate or reform the lance in the retainer after reassembly of the planetary friction and/or steel plates. Each insert has a circular recess 43 which accomodates the ball 32 of bolt 30. Each insert is comprised of a hard metal and has flat sidewalls 44 and end wall 45. However, in the case of insert 41 the front wall 46 is curved, the curvature being the same as the interior section 28. In the case of insert 42 the front wall 47 is also curved to the same degree as front wall 46 except that the center of the wall has formed therein rectilinear protrusion 48. The protrusion is accomodated by a rectilinear recess 49 formed in the outer wall of the curved interior section 28.

Figure 8:
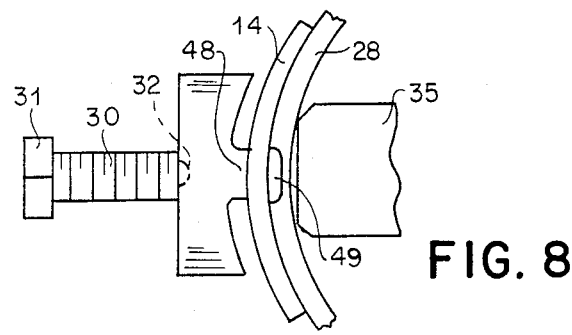
FIGS. 8 & 9 show diagrammatically the creation of a lance on a retainer using the tool and the insert of FIG. 5.
Figure 9:
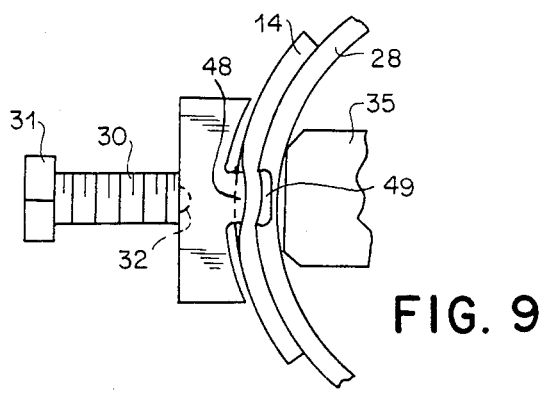

Referring now to FIGS. 3, 4, 6 & 7 use of the tool of the invention is shown. To disassemble the planetary it is first placed on the tool upside down as shown in FIG. 3 with insert 41 placed adjacenta bolt 30 between the interior and exterior sections 27 & 28, respectively (see also FIG. 1) at a position 180° from recess 49. The lance 25 in each retainer 14 is shown in FIG. 6. Referring to FIGS. 3 & 6, the bolt 30 is turned so it moves in the direction shown by the arrow. The ball 32 at the end of the bolt engages the recess 43 in insert 41 and moves the curvilinear wall inwardly so that it spans lance 25 and pushes the retainer 14 against the inner wall of interior section 28. The planetary is locked to the tool by means of plate member 35 and bolt 34. The function of the ball 32 and recess 43 is to prevent wear on the inserts. As the bolt is moved further inwardly, insert 41 applies compressive force to the lance 25 against the outer wall of curved section 28 until it achieves the curvilinear contour shown in FIG. 7, that is, the lance is removed. This procedure is repeated for each retainer 14 until all retainers have been delanced and curved. The planetary is then unlocked and removed from the tool, inverted, and the pressure plate 23 is removed. The friction or steel plates are removed and replaced and then the pressure plate is placed over the planetary through the retainers. To relock the pressure plate, referring to FIGS. 8 & 9, insert 42 of FIG. 5 is placed in the tool between bolt 30 and recess 49 so that protrusion 48 will register with recess 49. The planetary is inverted again over the tool as shown in FIG. 3 and locked in place by means of plate 35 and bolt 34. Bolt 30 is tightened toward inner section 28 and in so doing the center of retainer 14 is deformed to a lance as originally produced in the retainer as shown in FIG. 9. After forming a lance in each retainer using the above procedure the planetary is then unlocked, removed and ready to be placed in the transmission.

I claim:

1. A tool for removing and forming a lance on a retainer of the planetary of an automatic transmission comprising:
    (a) a circular base having a raised curved exterior section and a raised curved interior section spaced apart by a gap, said interior section having an indentation in the outer wall of said curved interior section;
    (b) a first insert fittable within said gap having a curved front wall facing said interior section of the same curvature as said interior section;
    (c) a second insert fittable within said gap having a protrusion in the front wall thereof capable of registering with such indentation; and
    (d) means for exerting inward compression between said first and second inserts against said interior section.

2. The tool of claim 1 wherein said tool further comprises means for locking said planetary to said tool.

3. A tool for removing and forming a lance from and in, respectively, a retainer of a planetary for an automatic transmission comprising:
    (a) a circular base having a raised curved exterior section and a raised curved interior section spaced apart by a gap, said curved outer section having first and second internally threaded bores extending therethrough, and said curved interior section having an indentation in the outer wall thereof;

(b) a first insert fittable within said gap adjacent said first bore having a curved front wall facing said interior section of the same curvature as said interior section;

(c) a second insert fittable within said gap adjacent said second bore having a protrusion in the front wall thereof capable of registering with said indentation;

(d) a first bolt threadable within said first bore and engageable with said first insert; and (e) a second bolt threadable within said second bore and engageable with said second insert.

4. The tool of claim 1 wherein said tool further comprises means for locking said planetary to said tool.

5. The tool of claim 1 wherein said first and second bolts have a ball in the ends thereof.

6. The tool of claim 5 wherein said first and second inserts have a recess therein which accomodates said balls in said first and second bolts.

* * * * *